(12) United States Patent
Hermann et al.

(10) Patent No.: US 9,649,825 B2
(45) Date of Patent: May 16, 2017

(54) PREPREGS

(71) Applicant: INFIANA GERMANY GMBH & CO. KG, Forchheim (DE)

(72) Inventors: Christian Hermann, Eggolsheim (DE); Roland Kelm, Forchheim-Kersbach (DE); Soheila Salehi-Schneider, Bubenreuth (DE)

(73) Assignee: INFIANA GERMANY GMBH & CO. KG, Forchheim (DE)

( * ) Notice: Subject to any disclaimer, the term of this patent is extended or adjusted under 35 U.S.C. 154(b) by 0 days.

(21) Appl. No.: 14/958,221

(22) Filed: Dec. 3, 2015

(65) Prior Publication Data

US 2016/0082698 A1  Mar. 24, 2016

Related U.S. Application Data

(63) Continuation of application No. PCT/EP2014/001523, filed on Jun. 5, 2014.

(30) Foreign Application Priority Data

Jun. 11, 2013  (DE) .................. 10 2013 009 679

(51) Int. Cl.
| | |
|---|---|
| C08K 7/00 | (2006.01) |
| B32B 7/06 | (2006.01) |
| B32B 5/02 | (2006.01) |
| B32B 7/12 | (2006.01) |
| B32B 27/12 | (2006.01) |
| B32B 27/34 | (2006.01) |
| B32B 27/18 | (2006.01) |
| B32B 27/32 | (2006.01) |
| C08J 5/04 | (2006.01) |
| C08J 5/24 | (2006.01) |

(52) U.S. Cl.
CPC .............. *B32B 7/06* (2013.01); *B32B 5/024* (2013.01); *B32B 7/12* (2013.01); *B32B 27/12* (2013.01); *B32B 27/18* (2013.01); *B32B 27/32* (2013.01); *B32B 27/34* (2013.01); *C08J 5/04* (2013.01); *C08J 5/24* (2013.01); *B32B 2260/021* (2013.01); *B32B 2260/046* (2013.01); *B32B 2262/0269* (2013.01); *B32B 2262/106* (2013.01); *B32B 2305/076* (2013.01); *B32B 2307/518* (2013.01); *B32B 2307/54* (2013.01); *B32B 2307/748* (2013.01); *B32B 2605/00* (2013.01); *B32B 2605/10* (2013.01); *B32B 2605/12* (2013.01); *B32B 2605/18* (2013.01); *C08J 2300/24* (2013.01)

(58) Field of Classification Search
CPC ................. B23B 7/06; C08J 5/24; C08J 5/04
See application file for complete search history.

(56) References Cited

U.S. PATENT DOCUMENTS

| | | | |
|---|---|---|---|
| 4,626,460 A | 12/1986 | Duncan | |
| 6,057,041 A | 5/2000 | Sumi et al. | |
| 6,440,566 B1 | 8/2002 | Maligie et al. | |
| 8,455,090 B2 * | 6/2013 | Schmidt | C08G 18/0895 428/292.1 |
| 9,504,652 B2 | 11/2016 | Filipcsei et al. | |
| 2013/0209521 A1 | 8/2013 | Filipcsei et al. | |
| 2016/0369132 A1 * | 12/2016 | Schuhmann | B32B 7/06 |

FOREIGN PATENT DOCUMENTS

| | | |
|---|---|---|
| CN | 101992573 A | 3/2011 |
| CN | 102294864 A | 12/2011 |
| CN | 103097379 A | 5/2013 |
| DE | 69 728 653 T2 | 3/2005 |
| JP | S59-101331 A | 6/1984 |
| JP | S61 154 812 A | 7/1986 |
| JP | 2001-260284 A | 9/2001 |

OTHER PUBLICATIONS

Extract of the "Handbook Composite materials", pp. 1.02 to 1.18, Edition 8, R & G Faserverbundwerkstoffe GmbH, published in 2003.

English Translation of International Search Report dated Sep. 16, 2014, mailed Oct. 1, 2014.

International Search Report dated Sep. 16, 2014, mailed Oct. 1, 2014.

* cited by examiner

*Primary Examiner* — Hannah Pak

(74) *Attorney, Agent, or Firm* — Norris McLaughlin & Marcus, P.A.

(57) ABSTRACT

A composite of I a prepreg made of a solid mixture of a reactive plastic resin and a reinforcing means in the form of a tissue or a fiber and II a removable release film comprising a multilayer structure of a) a release layer of at least one thermoplastic homo- or copolymer of $\alpha,\beta$ unsaturated olefins and at least one wax-like compound as a release additive, b) optionally an adhesion promoting layer, c) a layer of at least one thermoplastic polyamide homo- or copolymer, d) optionally an adhesion promoting layer, e) a release layer of at least one thermoplastic homo- or copolymer of $\alpha,\beta$ unsaturated olefins having a release coating based on a cured polysiloxane, f) a laminate adhesive layer, and g) a release layer of at least one thermoplastic polyester and a wax-like compound as a release additive.

13 Claims, No Drawings dd
PREPREGS

This application is a Continuation of International Patent Application No PCT/EP2014/001523 filed Jun. 5, 2014 which claims foreign priority benefit under 35 U.S.C. §119 of German Patent Application 10 2013 009 679.0 filed Jun. 11, 2013, the contents of all of which are incorporated herein by reference.

The present invention relates to a composite made of
I a prepreg made of a solid mixture of a reactive synthetic resin and a reinforcing material in the form of textile or of fiber and optionally conventional additives in the form of an optionally rolled-up, continuous web and
II a separable release film comprising a multi-layer structure made of
   a) directly adjoining the prepreg web, a release layer composed of at least one thermoplastic homo- or copolymer of $\alpha,\beta$-unsaturated olefins having a waxy compound as release additive and optionally conventional other additives and auxiliaries,
   b) optionally an adhesion-promoter layer,
   c) a layer composed of at least one thermo-plastic polyamide homo- or copolymer,
   d) optionally an adhesion-promoter layer,
   e) a release layer which is composed of at least one thermoplastic homo- or copolymer of $\alpha,\beta$-unsaturated olefins, and which has a release coating based on a cured polysiloxane, or as alternative to the layer e) a sublaminate made of
   e') a layer composed of at least one thermo-plastic homo- or copolymer of $\alpha,\beta$-unsaturated olefins preferably having from 2 to 10 carbon atoms, particularly preferably of $\alpha,\beta$-unsaturated olefins having at least 3 carbon atoms,
   f) a lamination adhesive layer, and
   g) a preferably biaxially orientated release layer which is composed of at least one thermoplastic polyester and one waxy compound as release additive, and optionally conventional other additives and auxiliaries, or as alternative to the layer g),
   g') a preferably biaxially orientated release layer which is composed of at least one thermoplastic polyester, and which has a release coating based on a cured polysiloxane,
to the use of this multilayer film as removable release film for a prepreg, and also to the use of the composite of the invention for the production of a composite material, preferably of a fiber-composite material.

BACKGROUND OF THE INVENTION

Prepregs, i.e. solid mixtures made of a reactive synthetic resin and a reinforcing material, in particular in fiber form, are an indispensible intermediate product in the production of composite materials, in particular fiber-composite materials; the increasing importance of these in numerous branches of industry, for example in aerospace technology, energy production by wind turbines, and construction of bicycles, rail vehicles, and ships is based on their exceptional combination of properties including relatively low weight and exceptionally high strength. These properties make it increasingly possible to use these composite materials successfully instead of high-density materials such as metals, despite higher production costs. Associated with this there is also the desire to maximize efficiency of production of these composite materials, and in particular to keep the cost of auxiliary production materials as low as possible.

Usually, the production of fiber-composite materials is carried out in a plurality of process steps whereby the resultant intermediate products sometimes require prolonged storage.

In this production of composite materials, prepregs are often the first intermediate product that is sometimes not stored at the premises of the producers of the final products, e.g. the producer of aircraft components, rotor blades for wind turbines, etc. Accordingly a requirement during intermediate storage either at the premises of the producer of the prepregs or at the premises of the processor of the prepregs to end products is therefore that the properties of the prepregs are not affected, and that problems by handling the prepregs during the final processing are minimized.

Therefore, when prepregs are produced by combining the reactive synthetic resin, as binder, with the reinforcing material to give a solid mixture, for purposes of protection and problem-free further processing of the prepregs said mixture is applied to a paper which has been siliconized at least on one surface and which can optionally be replaced by a polyethylene release film in the form of removable protective and release film. For numerous prepreg compositions it is moreover essential to equip both surfaces of a prepreg web with release paper or a removable polyethylene film in the form of release film, in order to guarantee problem-free further processing and storage.

Before the final processing of the prepregs, i.e. before final shaping thereof, said release films have to be removed, since the design and property profile of certain end products requires that a plurality of prepregs are combined. Since most processes for the final processing of fiber-composite materials have now been automated in order to maximize precision in the moldings, it is necessary to avoid any process problems due for example to break-off of the release films during their necessary removal. It is moreover desirable, in order to increase production efficiency, to minimize the extent of auxiliary materials that cause waste, and of removal thereof.

It was therefore an object of the present invention to provide a composite which is made of a prepreg and of a removable release film, which does not have the disadvantages of the prior art.

SUMMARY OF THE INVENTION

Said object is solved by the provision of an inventive composite comprising
I a prepreg made of a solid mixture of a reactive synthetic resin and a reinforcing material in the form of textile or of fiber and optionally conventional additives in the form of an optionally rolled-up, continuous web and
II a removable release film comprising a multi-layer structure made of
   a) directly adjoining the prepreg web, a release layer composed of at least one thermoplastic homo- or copolymer of $\alpha,\beta$-unsaturated olefins preferably having from 2 to 10 carbon atoms, particularly preferably of $\alpha,\beta$-unsaturated olefins having at least 3 carbon atoms, a waxy compound as release additive, and optionally conventional other additives and auxiliaries,
   b) optionally an adhesion-promoter layer,
   c) a layer composed of at least one thermo-plastic polyamide homo- or copolymer,
   d) optionally an adhesion-promoter layer,
   e) a release layer which is composed of at least one thermoplastic homo- or copolymer of $\alpha,\beta$-unsaturated olefins preferably having from 2 to 10 carbon atoms, particularly preferably of α,β-unsaturated olefins having at least 3 carbon atoms, and which has a release coating based on a cured polysiloxane, or as alternative to the layer e) a sublaminate made of e') a layer composed of at least one thermo-plastic homo- or copolymer of α,β-unsaturated olefins preferably having from 2 to 10 carbon atoms, particularly preferably of α,β-unsaturated olefins having at least 3 carbon atoms, f) a lamination adhesive layer, and g) a preferably biaxially orientated release layer which is composed of at least one thermoplastic polyester and one waxy compound as release additive, and optionally conventional other additives and auxiliaries, or g') a preferably biaxially orientated release layer which is composed of at least one thermoplastic polyester, and which has a release coating based on a cured polysiloxane as alternative to the layer g) of the sublaminate.

DETAILED DESCRIPTION

The use of the inventively release film allows successful production of composites made of a prepreg and of a removable release film, whereby only one film is required for the production of the inventive composite, because said release film is already used as carrier film during the production of the solid mixture of reactive resin and reinforcing material, and remains in the form of a continuous web removably bonded to the prepreg in the composite during the storage and until further processing takes place. Unlike in the known processes for production of prepregs, the use of the inventive release film does not require replacement of a release paper by a polyethylene release film prior to storage, or provision of release paper to both surfaces of the prepreg web, because the multilayer release film used in the invention has adequate release properties on both of its surfaces.

In one particularly preferred embodiment the two surfaces a) and e) or g') of the release film used in the invention have different release surface modification, since the ratio of release force of e) or g') to that of a) can be from 1:2 to 1:15, preferably from 1:4 to 1:8, which means that the separation of the layer a) from the prepreg differs from that of the layer e) or g'), thus providing the possibility that the difference in protection of the two surfaces of the prepreg corresponds to the time difference necessary for final processing each surface.

Since moreover the release film used in the invention is removable on both surfaces, there is also no need for application, as was the case during processing hitherto, of a release-paper web and subsequently a PE film for the temporary protective covering of the surfaces of the prepreg. This type of film can lead to the problems mentioned above during the production of prepregs, an example being torn-off due to inadequate mechanical stability, and causing interruption of production.

The release films used in the invention moreover feature excellent thermal stability over a wide range of temperatures during the processing of the composite, and also very good mechanical strength, in particular tear propagation strength. Since, in addition, only one film web is necessary for use as release film, the quantities of waste are dramatically reduced in comparison to the known processes for producing prepregs.

Other achievements resulting from the inventive use of the release film are not only a very good, highly advantageous tear-propagation resistance and highly advantageous release properties during the processing of the composites of the invention to give the final products, but also the advantage of avoiding any dust resulting from silicone release paper. Paper, and therefore silicone release paper, is moreover highly moisture-sensitive, and this can cause web tear-offs during the removal of these paper release films; the inventive use of the multilayer release film as component of the inventive composites avoids these problems.

Reactive synthetic resins that can be used for the production of the prepregs are preferably reactive synthetic resins which are reacted via known reactions to give thermoset synthetic resins, and are in particular reactive epoxy resins, reactive unsaturated polyester resins, reactive polyurethane resins, or reactive phenol-formaldehyde resins.

The person skilled in the art is aware that these reactive synthetic resins usually comprise reactants such as reaction accelerators, catalysts, initiators, crosslinking agents, and/or monomers which, during prepreg production, react at least to the extent that the synthetic resin, while it remains reactive, acts as binder for the reinforcing material in textile or fiber form to give a solid mixture. Thereby the reactive synthetic resin can at least to a certain extent undergo what is known as curing. Said curing is achieved by various types of reaction, for example free-radical polymerization, e.g. of unsaturated polyester resins, polyaddition, as is the case with epoxy resins, or polycondensation, as by way of example in the case of phenol-formaldehyde resins. Although these curing reactions can already start during prepreg production, they mainly take place only during the final use of the prepreg, whereby the curing of the reactive synthetic resins continues and is completed to give a three-dimensionally crosslinked polymer, known as a thermoset plastic.

The prepregs comprise, as reinforcing material, reinforcing material in textile or fiber form, preferably reinforcing material made of textile glass, in particular staple fibers or rovings, made of carbon fibers or aramid fibers in textile form, or strands made of parallel spun filaments or continuous-filament fibers, or in the form of short individual fibers of small diameter.

The prepreg is removable bonded to a release film and is usually separated therefrom only during final processing of the prepreg.

This release film used in the invention comprises a multilayer structure made of a) directly adjoining the prepreg web, a release layer composed of at least one thermoplastic homo- or copolymer of α,β-unsaturated olefins preferably having from 2 to 10 carbon atoms, particularly preferably of α,β-unsaturated olefins having at least 3 carbon atoms, a waxy compound as release additive, and optionally conventional other additives and auxiliaries, b) optionally an adhesion-promoter layer, c) a layer composed of at least one thermo-plastic polyamide homo- or copolymer, d) optionally an adhesion-promoter layer, e) a release layer which is composed of at least one thermoplastic homo- or co-polymer of α,β-unsaturated olefins preferably having from 2 to 10 carbon atoms, particularly preferably of α,β-unsaturated olefins having at least 3 carbon atoms, and which has a release coating based on a cured polysiloxane, or as alternative to the layer e) a sublaminate made of e') a layer composed of at least one thermo-plastic homo- or copolymer of α,β-unsaturated olefins preferably having from 2 to 10 carbon atoms, particularly preferably of α,β-unsaturated olefins having at least 3 carbon atoms, f) a lamination adhesive layer, and g) a preferably biaxially orientated release layer which is composed of at least one thermoplastic polyester and one waxy compound as release additive, and optionally conventional other additives and auxiliaries, or g') a preferably biaxially orientated release layer which is composed of at least one thermoplastic polyester, and which has a release coating based on a cured polysiloxane as alternative to the layer g) of the partial composite.

This multilayer release film is preferably suitable not only for the production of composites with prepregs but also for storage and further processing thereof, because the use of said release film guarantees the abovementioned advantages in the production and processing of composites of the invention.

The layer a) of this release film is a release layer which directly and removably adjoins the prepreg and which is composed of at least one thermoplastic homo- or copolymer of α,β-unsaturated olefins preferably having from 2 to 10 carbon atoms, particularly preferably of α,β-unsaturated olefins having at least 3 carbon atoms, and at least one waxy compound as release additive, and optionally conventional auxiliaries.

Suitable materials for the structure of the release layer a), the release layer e), and also the layer e'), are the thermoplastic olefin homo- or copolymers mentioned with melting point at least 125° C., preferably thermoplastic olefin homo- or copolymers of α,β-unsaturated olefins having from 2 to 10 carbon atoms, e.g. polyethylene, in particular HDPE, polypropylene (PP), polybutylene (PB), polyisobutylene (PI), or a mixture of at least two of the polymers mentioned. "HDPE" means high-density polyethylene, where this has only a small amount of branching of the molecular chain; the density here can be in the range from 0.94 to 0.97 g/cm$^3$. Preferred polyolefins for the production of the layer (a) are HDPE, homo- or copolymers of propylene, particularly preferably polypropylene, or an ethylene/propylene copolymer.

The layers a), e), and e') can be composed of the same kind of thermoplastic homo- or copolymer.

The thickness of each of these layers is preferably from 5 to 60μ, in particular from 10 to 50μ, and it is preferable here that the thickness of the layers a), e), and e') is the same.

In order to achieve the required release properties of the release film used in the invention, removably bonded not only to the cured prepreg but also optionally to the hardened prepregs, i.e. to the fiber-composite material, at least one waxy compound is added as release additive to each of the layers a) and g) and/or is present as surface modification of the layer a) and/or of the layer g).

Waxy compounds, which are preferably lipophilic, can preferably be used as release additive for achieving the required release effect of the release film used in the invention.

The term wax is used for a wide variety of chemically different compounds which are defined as wax by virtue of their mechanicophysical properties. Among these properties are kneadability at 20° C., highly temperature-dependent consistency and solubility, ability to provide a polished surface under light pressure, melting above 40° C. without decomposition, coarse-to-fine-crystalline structure, low viscosity above melting point, translucent to opaque, but non-glassy, appearance, and also firm to friable hardness. Particularly preferred waxy compounds are selected from the group comprising fatty acids, fatty alcohols, long-chain amines, fatty acid esters, and fatty acid amides.

In one preferred embodiment the release film used in the invention comprises as waxy, preferably lipophilic compound, at least one compound selected from the group comprising fatty acids, preferably $C_{7-30}$-alkyl and $C_{7-30}$-alkenyl fatty acids, fatty alcohols, preferably $C_{7-30}$-alkyl and $C_{7-30}$-alkenyl fatty alcohols, long-chain amines, preferably $C_{7-30}$-alkyl- and $C_{7-30}$-alkenylamines, fatty acid esters, and fatty acid amides, where the softening point or melting point of these at atmospheric pressure is at least 30° C., preferably at least 50° C., particularly preferably at least 80° C., very particularly preferably at least 100° C.

For the purposes of the present invention, the term "alkyl" and, respectively, "$C_{7-30}$-alkyl" encompasses $C_{7-30}$-alkanyl moieties, i.e. acyclic, saturated, aliphatic hydrocarbon moieties which can be branched or unbranched, having from 7 to 30 carbon atoms, i.e. having 7, 8, 9, 10, 11, 12, 13, 14, 15, 16, 17, 18, 19, 20, 21, 22, 23, 24, 25, 26, 27, 28, 29, or 30 carbon atoms. It is preferable that $C_{7-30}$-alkyl is selected from the group comprising n-heptyl, n-octyl, n-nonyl, n-decyl, undecyl, dodedyl, tridecyl, tetradecyl, pentadecyl, hexadecyl, heptadecyl, octadecyl, nonadecyl, eicosyl, henicosyl, docosyl, tricosyl, tetracosyl, pentacosyl, hexacosyl, heptacosyl, octacosyl, nonacosyl, and triacontyl. A particularly preferred $C_{7-30}$-alkyl moiety is a $C_{11-20}$-alkyl moiety, i.e. a $C_{11-20}$-alkanyl moiety having from 11 to 20 carbon atoms, i.e. having 11, 12, 13, 14, 15, 16, 17, 18, 19, or 20 carbon atoms. A very particularly preferred $C_{7-30}$-alkyl moiety is a $C_{14-20}$-alkyl moiety, i.e. a $C_{14-20}$-alkanyl moiety having from 14 to 20 carbon atoms, i.e. having 14, 15, 16, 17, 18, 19, or 20 carbon atoms.

For the purposes of the present invention, the term "alkenyl" and, respectively, "$C_{7-30}$-alkenyl" encompasses $C_{7-30}$-alkenyl moieties, i.e. acyclic unsaturated aliphatic hydrocarbon moieties which can be branched or unbranched, having from 7 to 30 carbon atoms, i.e. having 7, 8, 9, 10, 11, 12, 13, 14, 15, 16, 17, 18, 19, 20, 21, 22, 23, 24, 25, 26, 27, 28, 29, or 30 carbon atoms. Alkenyl moieties have at least one C=C double bond and can optionally have 2, 3, 4, 5, or 6 such bonds.

It is preferable that alkenyl is selected from the group comprising n-heptenyl, n-octenyl, n-nonenyl, n-decenyl, undecenyl, dodecenyl, tridecenyl, tetradecenyl, pentadecenyl, hexadecenyl, heptadecenyl, octadecenyl, nonadecenyl, eicosenyl, henicosenyl, docosenyl, tricosenyl, tetracosenyl, pentacosenyl, hexacosenyl, heptacosenyl, octacosenyl, nonacosenyl, and triacontenyl. A particularly preferred $C_{7-30}$-alkenyl moiety is a $C_{11-20}$-alkenyl moiety having from 11 to 20 carbon atoms, i.e. having 11, 12, 13, 14, 15, 16, 17, 18, 19, or 20 carbon atoms. A very particularly preferred $C_{7-30}$-alkenyl moiety is a $C_{14-20}$-alkenyl moiety having from 14 to 20 carbon atoms, i.e. having 14, 15, 16, 17, 18, 19, or 20 carbon atoms.

For the purposes of this invention, the expression "fatty acid ester" can firstly mean an ester of a mono-or polyhydric alcohol, i.e. by way of example of a di-, tri-, tetra-, or pentahydric alcohol, where at least one of the alcohol functions of said polyhydric alcohol has been esterified with an aliphatic, branched or unbranched, saturated or unsaturated fatty acid, preferably with a $C_{7-30}$-alkyl or $C_{7-30}$-alkenyl fatty acid. If a plurality of alcohol functions of the polyhydric alcohol have been esterified with fatty acids, each of these alcohol functions can have been mutually independently esterified with different fatty acids. Preferred polyhydric alcohols are ethylene glycol, glycerol, and 1,4- butanediol. Particular preference is given to ethylene glycol and glycerol. The expression glycerol fatty acid ester therefore encompasses monoglycerides, diglycerides, and triglycerides. For the purposes of the present invention, the expression "fatty acid ester" can also mean an ester of a mono- or polybasic carboxylic acid, i.e. by way of example a di-, tri-, tetra-, or pentabasic carboxylic acid, where at least one of the carboxylic acid functions of said polybasic carboxylic acid has been esterified with an aliphatic, branched or unbranched, saturated or unsaturated fatty alcohol, preferably with at least one $C_{7-30}$-alkyl, or at least one $C_{7-30}$-alkenyl, fatty alcohol. Examples of preferred fatty acid esters are ethylene bispalmitate, ethylene palmitate stearate, and ethylene bisstearate.

For the purposes of the present invention, the expression "fatty acid amide" means an amide of a mono-or polyfunctional amine, i.e. by way of example a di-, tri-, tetra-, or pentafunctional amine, where at least one of the amine functions of said polyfunctional amine has formed an amide with an aliphatic, branched or unbranched, saturated or unsaturated fatty acid, preferably with a $C_{7-30}$-alkyl or $C_{7-30}$-alkenyl fatty acid. If a plurality of amine functions of the polyfunctional amine have formed amide bonds with fatty acids, each of said amine functions can mutually independently have formed amide bonds with different fatty acids. An example of a preferred polyfunctional amine is ethylenediamine. For the purposes of the present invention, the expression "fatty acid amide" can also mean an amide of a mono- or polybasic carboxylic acid, i.e. by way of example a di-, tri-, tetra-, or pentabasic carboxylic acid, where at least one of the carboxylic acid functions of said polybasic carboxylic acid has formed an amide with an aliphatic, branched or unbranched, saturated or unsaturated amine, preferably with at least one $C_{7-30}$-alkylamine or at least one $C_{7-30}$-alkenylamine. Examples of preferred fatty acid amides are ethylenebispalmitamide, ethylenepalmitamidestearamide, and ethylenebisstearamide. A particularly preferred fatty acid amide is ethylenebisstearamide (N,N'-ethylenebisstearamide).

The quantity of the release additive in each of the layers a) and g) can be from 1 to 20% by weight, preferably from 2 to 15% by weight, particularly preferably from 2 to 6% by weight, based on the total weight of the respective layer. Each of the layers mentioned comprising release additive can comprise different quantities of the release additive, or preferably the same quantity of release additive.

As already mentioned, the release additive can also take the form of surface modification on the surface of each of the layers a) and g) mentioned, to the extent that these are a surface layer. For the purposes of the present compound, the expression "surface modification" means that a coating or covering based on at least one release additive is present on said release layer of the release film used in the invention. To this end, the respective layer can have been coated with the waxy compound or can have a covering resulting from migration of at least one waxy, preferably lipophilic compound.

The release layers, as surface layers, can comprise conventional additives such as stabilizers, antiblocking agents, antistatic agents, and/or lubricants.

The release film used in the invention also has a polyamide layer c) preferably bonded by way of adhesion-promoter layers to the layer a) and, respectively, e) or e').

Suitable materials for the production of the layer c) are thermoplastic aliphatic, semiaromatic, or aromatic polyamide homo- or copolymers. These polyamides are polyamides made of at least one diamine such as an aliphatic diamine having from 2 to 10 carbon atoms, in particular hexamethylenediamine and/or isophorone-diamine, or at least one aromatic diamine having from 6 to 10 carbon atoms, in particular p-phenylenediamine, and dicarboxylic acids such as at least one aliphatic or aromatic dicarboxylic acid having from 6 to 14 carbon atoms, e.g. adipic acid, terephthalic acid (T), and/or isophthalic acid (I). The polyamides can moreover have been produced from lactams having from 4 to 10 carbon atoms, e.g. ε-caprolactam. Polyamides particularly suitable for the production of the layer c) are by way of example PA 6, PA 12, PA 66, PA 6I, PA 6T, and/or mixtures of at least two of the polyamides mentioned.

The thickness of the polyamide layer is preferably from 5 to 40μ, particularly preferably from 8 to 30μ.

Each of the optionally present adhesion-promoter layers b) and d) of the release film used in the invention is preferably based on at least one modified thermoplastic olefin homo- or copolymer.

Materials suitable for the production of the adhesion-promoter layers b) and d) are preferably modified thermoplastic olefin homo- or copolymers of α,β-unsaturated olefins having from 2 to 10 carbon atoms, e.g. polyethylene (PE, in particular LDPE or HDPE), polypropylene (PP), polybutylene (PB), polyisobutylene (PI), or a mixture of at least two of the polymers mentioned. "LDPE" means low-density polyethylene, the density of which is in the range from 0.86 to 0.93 g/cm$^3$, and which features a high degree of branching of the molecules. "HDPE" means high-density polyethylene, which has only a small degree of branching of the molecular chain; density here can be in the range from 0.94 to 0.97 g/cm$^3$. A preferred modified thermoplastic olefin homo- or copolymer for the production of the adhesion-promoter layers b) and d) is modified propylene homopolymer (z). It is preferable that the thermoplastic olefin homo- or copolymers have been modified with polar groups, preferably with organic acid groups (carboxy groups), and/or organic anhydride groups, particularly preferably maleic anhydride groups. A polypropylene modified with maleic anhydride groups is very particularly preferably suitable as adhesion-promoter component.

It is also possible to use an olefin/alkyl (meth)acrylate copolymer as polymeric component of the adhesion-promoter layers.

These copolymers of an α,β-unsaturated olefin and at least one other α,β-unsaturated monomer having at least one ester group, preferably one alkyl (meth)acrylate group, are at least one compound selected from the group comprising copolymers of alkyl (meth)acrylates, preferably methyl (meth)acrylate, ethyl (meth)acrylate, n- and isopropyl (meth)acrylate, n- and isobutyl (meth)acrylate, tert-butyl (meth)acrylate, 2-ethylhexyl (meth)acrylate, cyclohexyl (meth)acrylate, and isobornyl (meth)acrylate, particularly preferably butyl (meth)acrylate, with α,β-unsaturated olefins preferably having from 1 to 8 carbon atoms, particularly preferably ethylene or propylene.

It is preferable that an ethylene-$C_{1-4}$-alkyl acrylate copolymer is present as copolymer of the adhesion-promoter component, particular preference being given here to an ethylene-butyl acrylate copolymer, the quantity thereof preferably being up to 40% by weight, based in each case on the total weight of an adhesion-promoter layer.

The thickness of each of the adhesion-promoter layers b) and d) of the release film used in the invention is preferably, mutually independently, from 1 μm to 30 μm, particularly preferably from 2 μm to 17 μm.

In one preferred embodiment of the release film used in the invention, the adhesion-promoter layers b) and d) are present and have identical layer structure, and preferably identical thickness, and/or identical polymer components.

To the extent that during the production of the prepreg the composite is exposed to tensile loading, even if this is only brief, or is exposed, during process problems, to temperatures above 130° C. for a prolonged period, the multilayer release film used in the invention can preferably comprise a sublaminate made of the layers e') to g') instead of only the layer e), in order to ensure the necessary thermal stability over the widest possible range of temperature.

For this, the release film used in the invention comprises, instead of the layer e), a partial composite bonded by way of a lamination adhesive layer f), with the layer e') and with the surface layer g), or alternatively with the layer g').

The layer g) and, respectively, g') has preferably been biaxially orientated in order to increase the strength of the layer, and as a result of doping with a release additive and, respectively, a release coating made of cured polysiloxane has, during the further processing of by way of example stacked prepreg webs during the course of further processing of prepreg webs, a release effect that is adequate but in each case of different magnitude.

The lamination adhesives required for the production of the lamination adhesive layer are known to the person skilled in the art and can preferably be composed of two-component polyurethane adhesives.

Thermoplastic, aliphatic, semiaromatic, or aromatic polyester homo- or copolymers can be used as polyesters for the production of the layer g) and, respectively, g'). These polyesters can be derived from aliphatic diols, e.g. ethylene glycol or 1,4-butanediol, and from aliphatic or aromatic dicarboxylic acids or dicarboxylic acid derivatives, preferably adipic acid, isophthalic acid, and/or terephthalic acid. It is possible in the invention to use polybutylene adipate (PBA), polyethylene terephthalate (PET), polyethylene isophthalate, polybutylene terephthalate (PBT), or corresponding copolyesters for the production of the layer g) and, respectively, g').

In order to achieve the necessary release properties of the release film used in the invention in relation to prepregs exhibiting high tack, the release film used in the invention has a release coating on the surface of the layer e) and, respectively, the layer g'). It is preferable that the release layer is based on at least one cured polysiloxane.

For the purposes of the present invention the term "polysiloxane" means compounds of which the polymer chains are composed of silicon atoms and oxygen atoms in alternation. A polysiloxane is based on n repeating siloxane units ($-[Si(R_2)-O]-$)$_n$ which respectively mutually independently have disubstitution by two organic moieties R, where R is preferably in each case $R^1$ or $OR^1$, and $R^1$ is in each case an alkyl moiety or an aryl moiety.

It is preferable that the cured polysiloxane of the invention is based on a repeating dialkylsiloxane unit or on a repeating alkylarylsiloxane unit. By considering the number of Si—O bonds in any individual siloxane unit, in each case based on a tetravalent silicon atom, it is possible to classify these units as terminal monofunctional siloxanes (M) having one Si—O bond, difunctional siloxanes (D) having two Si—O bonds, trifunctional siloxanes (T) having three Si—O bonds, and tetrafunctional siloxanes (Q) having four Si—O bonds. It is preferable that the polysiloxane used in the invention has a crosslinked ring-type of chain-type structure, particularly a crosslinked chain-type structure, linked via (D), (T), and/or (Q) units to give a two- or three-dimensional network. The number n of repeating siloxane units ($-[Si(R_2)-O]-$)$_n$ in the polysiloxane chain is termed the degree of polymerization of the polysiloxane.

The release coating is preferably based on at least one cured, i.e. crosslinked, polysiloxane selected from the group comprising addition-crosslinked, preferably metal-catalyzed-addition-cross linked, condensation-crosslinked, free-radical-crosslinked, cationically crosslinked, and/or moisture-crosslinked polysiloxanes.

It is preferable that the release coating is based on at least one cured polysiloxane which has been cured by thermal curing, via curing by electromagnetic radiation, preferably via UV radiation, or via exposure to moisture. It is preferable that the release coating of the release film used in the invention is based on at least one cured polysiloxane selected from the group comprising polydialkylsiloxanes, preferably polydimethylsiloxanes, and polyalkylarylsiloxanes, preferably polymethylphenylsiloxanes, in each case cured.

Thermally cured polysiloxanes are obtained by using a compound having at least one carbon double bond for thermal hydrosilylation of polysiloxanes having silane functions. In the case of the polysiloxanes cured via electromagnetic radiation, the crosslinking of the polysiloxanes is achieved via electromagnetic radiation, preferably via UV radiation. The poly-siloxanes crosslinked via exposure to moisture, preferably to water, are obtained through a polycondensation reaction in which at least one silane function and at least one alkoxy group, or at least one alkoxysilane group, form an Si—O bond, with elimination of at least one molecule of alcohol. The polysiloxanes to be cured therefore respectively have the reactive functional groups required for the crosslinking reaction.

The layer thickness of the release coating of the release film used in the invention is preferably from 0.1 μm to ≤3 μm, preferably from 0.2 μm to 1.5 μm.

The surface of the layer a) of the release film used in the invention can optionally also have been equipped with a release layer based on the cured polysiloxane mentioned, instead of doping with a release additive.

As already stated, the production of prepregs, i.e. of solid mixtures of a reactive synthetic resin and of a reinforcing material in textile or fiber form and optionally of conventional additives, in the form of continuous web with use of release films, such as silicone release paper and polyethylene release films is a well known procedure. For this it is preferable that the reinforcing material in the form of textile or fiber, preferably a textile glass in the form of staple fiber or rovings, carbon fiber, or aramid fibers, is continuously combined with the reactive synthetic resin; a sufficient condition for the production of the solid mixture here is that the reactive synthetic resin provides a material of very high viscosity; or the reactive synthetic resin is placed in an oven, together with the reinforcing material in a stage of this type or is converted to a solution with this type of viscosity by using a suitable solvent. The reinforcing material is placed together with the reactive synthetic resin onto a silicone release paper and heated in an oven for less than one minute, optionally with exposure to pressure, thus providing, after discharge from the oven, an embedded reinforcing material in a matrix made of reactive synthetic resin and necessary reactants, for example curing agent and/or accelerators, and also dyes and other auxiliaries.

In the known production process, in order to avoid the abovementioned difficulties and disadvantages that can arise during the use of silicone release papers as carrier layer, the silicone release paper is removed from the prepreg and a polyethylene release film is rolled up as release film with the prepreg in web form.

However, because of inadequate tensile strength it is not possible to use this type of polyethylene release film in the production of the prepregs.

The multilayer release film used in the invention eliminates the known problems during the production and further processing of the prepregs, and this release film therefore has excellent suitability for the production of composites in web form made of a prepreg and of the release film used in the invention.

These composites of the invention made of a prepreg and of the release film described above also make it easier to use this type of composite for the production of structural components made of composite materials which are in particular used as components in the aircraft industry, for wind turbines, and for sports products, ships, rail vehicles, and other means of transport, because when composites of this type are produced and further processed, preferably in the form of a continuous web, no dusting caused by a silicone release paper can occur, and when the cured prepregs are subjected to finishing there is no interruption of production and damage to components caused by difficult or inadequate removal of the release film. This use of the composite of the invention is also provided by the present invention.

The person skilled in the art is aware of the curing conditions for the various reactive synthetic resins, doping with reactants for the curing reaction, and the respective procedure, and also the structure of the structural components.

The present invention therefore also provides the use of the multilayer release film used in the invention for the production of a composite of the invention with a prepreg, preferably in the form of an optionally rolled-up, continuous web where, preferably after cooling below 20° C. and optionally moisture-tight packaging, the shelflife of the composite of the invention is at least six months.

What is claimed is:

1. A composite comprising
I a prepreg made of a solid mixture of a reactive synthetic resin, a reinforcing material in the form of textile or of fiber, and optionally additives, in the form of an optionally rolled-up, continuous web and
II a removable release film comprising a multi-layer structure made of
a) directly adjoining the prepreg web, a release layer composed of at least one thermoplastic homo- or copolymer of α,β-unsaturated olefins, a waxy compound as release additive, and optionally other additives and auxiliaries,
b) optionally an adhesion-promoter layer,
c) a layer composed of at least one thermoplastic polyamide homo- or copolymer,
d) optionally an adhesion-promoter layer,
e) a release layer which is composed of at least one thermoplastic homo- or copolymer of α, β-unsaturated olefins, and which has a release coating based on a cured polysiloxane, or as alternative to the layer e) a sublaminate made of
e') a layer composed of at least one thermoplastic homo- or copolymer of α,β-unsaturated olefins,
f) a lamination adhesive layer, and
g) a release layer which is composed of at least one thermoplastic polyester and one waxy compound as release additive, and optionally other additives and auxiliaries, or
g') a release layer which is composed of at least one thermoplastic polyester, and which has a release coating based on a cured polysiloxane as alternative to the layer g) of the sublaminate.

2. The composite as claimed in claim 1, wherein the prepreg I is composed of a solid mixture of a reactive synthetic resin, a reinforcing material in textile or fiber form, and additives.

3. The composite as claimed in claim 1, wherein the prepreg I is composed of a solid mixture of a reactive synthetic resin, and a reinforcing material made of textile glass, additives in the form of reactive agents, accelerator, catalysts, and optionally α,β-unsaturated monomers, and optionally fillers.

4. The composite as claimed in claim 1, wherein each of the release layer a), the layer e), and the layer e') is composed of at least one thermoplastic homo- or copolymer of α,β-unsaturated olefins with melting point at least 125° C.

5. The composite as claimed in claim 1, wherein the quantity present of the release additive in the layer a) and, respectively, the layer g) is from 1 to 20% by weight, based on the total weight of the respective layer.

6. The composite as claimed in claim 1, wherein each of the layers comprising release additive comprises a different quantity of release additive, or comprises the same quantity of release additive.

7. The composite as claimed in claim 1, wherein the release additive is at least one waxy compound selected from the group consisting of fatty acids, fatty alcohols, long-chain amines, fatty acid esters, and fatty acid amides, where the softening point or melting point of these at atmospheric pressure is at least 30° C.

8. The composite as claimed in claim 1, wherein the layer c) is composed of at least one thermoplastic, aliphatic, semiaromatic, or aromatic polyamide homo- or copolymer.

9. The composite as claimed in claim 1, wherein each of the layers a), e), and e') is composed of the same thermoplastic homo- or copolymers of α,β-unsaturated olefins.

10. The composite as claimed in claim 1, wherein the thickness of each of the layers a), e), and e') is identical.

11. The composite as claimed in claim 1, wherein the release layer g) and, respectively, g') is composed of at least one thermoplastic polyester selected from the group consisting of thermoplastic, aliphatic, semiaromatic, or aromatic homo- and copolyesters.

12. The composite as claimed in claim 1, wherein after packaging the composite has a shelflife of at least 6 months.

13. A method for the production of a structural component for wind turbines, aircraft, ships, rail vehicles, sports products, or sports equipment, which comprises manufacturing said structural component with the composite of claim 1.

* * * * *